June 12, 1945.  C. E. SLAUGHTER  2,377,908
EXTRUDED THERMOPLASTIC TUBING
Filed Jan. 27, 1943
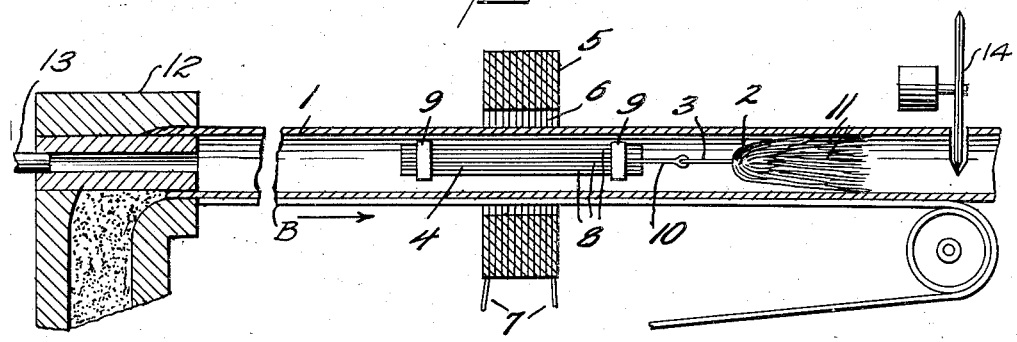
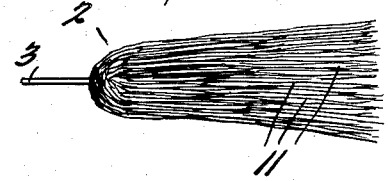
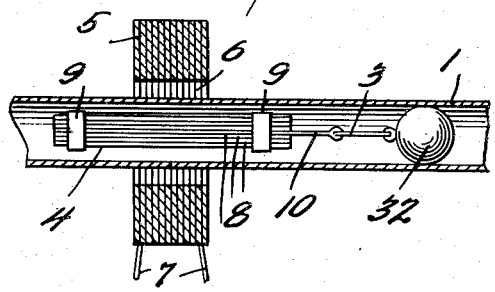
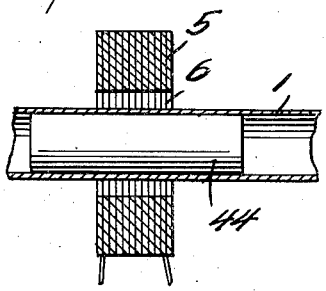
Inventor
C. E. Slaughter,
By Sol Shappirio
Attorney Patented June 12, 1945

2,377,908

UNITED STATES PATENT OFFICE 2,377,908

EXTRUDED THERMOPLASTIC TUBING

Charles E. Slaughter, New Canaan, Conn., assignor to Extruded Plastics, Inc., Norwalk, Conn., a corporation of Connecticut Application January 27, 1943, Serial No. 474,047

16 Claims. (Cl. 18—14)

This invention relates to methods and machines and apparatus for the extrusion of thermoplastic tubing, particularly synthetic resinous in character.

In the extrusion of thermoplastic tubing considerable difficulty has been experienced in the production of such tubing of large internal bore or diameter and also in cases of smaller diameter tubing where the wall of the tube is insufficient in thickness to prevent collapse during the course of manufacture. For example, in one method of extrusion, the tubing from the regular extrusion die is passed directly into a water bath set at a predetermined temperature, which bath exhibits two different effects on the tubing. The low temperature of the water compared with that of the hot plastic, hardens it to a predetermined shape and so prevents collapse of the tubing from the effect of gravity. At the same time, however, the pressure exerted by the water tends to make the tubing collapse since the external pressure, due to the surrounding water, is greater than the internal pressure.

In small diameter tubing, as for instance, ¼ inch O. D. with a ₃₂ inch wall, or even in the larger diameter tubing, such as ¾ inch but with a very small bore, as for instance, ¼ inch bore, the pressure exerted by the water is insufficient to cause deformation; but in the thinner walls, especially in the larger diameters, this collapse is very serious. To overcome this external water pressure, it is necessary to balance the internal pressure exactly against the external pressure.

One expedient to balance these pressures is to extrude the tubing vertically into water or other coolant while blowing air through the core of the die to balance the column of water around the tube. This expedient requires expensive installation since it is necessary to extrude from a height of not less than 20 feet in order to obtain a standard commercial 12 foot length, and in addition the problem of cutting off to length is very difficult since this must be carried out while the tubing is submerged to a depth of 8 or 10 feet.

A further expedient which may be used with very flexible types of tubing, such as polyvinyl resins, etc., consists of sealing the tube and blowing air into it. When it is necessary to cut the tubing to length, the tube is resealed just before the cut. This is most unsatisfactory as it is impossible to control the air pressure exactly and further, this process is not commercially possible on the rigid types of resins, such as the styrenes, acetate butyrates, unplasticized vinyls, etc.

Nor has it proved particularly satisfactory to seal the end of the tube with a stopper such as a rubber cork provided with a small hole cut through its length to permit a small stream of air to pass through, while at the same time building up sufficient back pressure so that the internal pressure exerted by the air and the external pressure exerted by the water are balanced. Even with this expedient the tubing cannot be cut without causing a collapse, which collapse while not so serious in the smaller diameter tubing, involving a waste of a few feet of misformed tubing, is so serious with larger diameter tubing such as 1 inch and above, that the process is uneconomical.

Among the objects of the present invention is the provision of methods and apparatus and machines enabling the ready production of thermoplastic tubing, such as synthetic resinous tubing, by extrusion without any of the difficulties referred to above.

Further objects and advantages of the present invention will appear from the more detailed description set forth below, it being understood that this more detailed description is given by way of explanation and illustration only, and not by way of limitation, since various changes therein may be made by those skilled in the art without departing from the scope and spirit of the present invention.

In connection with that more detailed description, there is shown in the accompanying drawing, in Figure 1, an elevation, partly in section, illustrating one device that may be employed in accordance with the present invention; in Figure 2, a detail of a floating plug shown in Figure 1; in Figure 3, a modified form of apparatus that can be utilized in accordance with the present invention; and in Figure 4, a further modification of apparatus that can be employed in carrying out the present invention.

In accordance with the present invention, collapse of tubing of extruded thermoplastic character, is prevented by maintaining fluid pressure within the tubing by means of a floating plug placed within the tubing. Thus considering methods desirably employed in producing such extruded thermoplastic tubing, where the tubing is extruded, from the usual extrusion die, and then cooled to a partially set condition, and cut to predetermined lengths, fluid pressure such as air pressure is maintained within the tubing during extrusion and cooling desirably between the point of extrusion and cutting by floating a plug within the tubing to maintain the fluid pressure therein to prevent collapse.

As illustrated in Figure 1, the extruded thermoplastic tubing 1 after extrusion from the usual extruding die 12 and immersion in a cooling bath such as water, (not shown), is received on the belt conveyor B. The usual means 13 is utilized for introducing fluid pressure such as air pressure, within the tube 1 by appropriate means within the die, as through a cross-head.

A plug 2 is floated within the tubing 1 at some convenient position between the points of extrusion and cutting may be maintained within the tubing 1 by being anchored by the strand 3 to a magnetizable core 4. A solenoid 5 of annular cross-section has a central opening 6 within which the extruded tubing 1 may pass freely, electrical connections 7 being provided for the solenoid 5. The core 4 may consist of a number of lengths of Swedish iron wire 8, held together by bands 9, one of the wires such as 10 extending beyond the core and constituting the strand 3 to which the plug 2 is attached.

Desirably the plug 2 consists of a number of woolen strands 11.

Strands of wool may desirably be used for the tail or plug 2 as it has been found that the static electricity generated by the plastic traveling over the rubber conveyor belt, holds the strands of wool in contact with the internal surface of the plastic and permits internal pressure of the fluid or air to be maintained within close limits such as plus or minus one inch of water pressure. The plug or tail 2 may thus be said to float within the tubing 1 while the latter is being carried forward by the conveyor belt B and yet effectively seals the fluid pressure within the extruded tubing 1 so that when the tubing passes to the cutting or shearing element 14 the pressure is maintained within the tubing while it is being extruded and prevents any collapse.

The form of device, and means for floating the plug or tail within the tubing, including the tail itself of woolen strands, the solenoid, and the core may be replaced by other means and expedients, so long as a floating plug is maintained within the tubing to retain the necessary pressure to prevent collapse of the tubing. The method and means illustrated may be utilized in producing tubing of any desired internal bore or diameter and for the first time makes it possible to extrude thermoplastics, particularly synthetic resinous tubing of relatively large internal diameter, such as 1 inch, 1½ inch and larger. If desired, particularly in the case of the larger size extruded tubing, or in event where desired, several floating plugs may be positioned within the tubing at any desired points.

It is desirable to place the plug for maintaining the pressure within the tubing, at a substantial distance from the extrusion die since in this way, there is provided a comparatively large volume of entrapped air between the point of extrusion and the point where the plug is positioned, and this comparatively large volume of entrapped air within the tube acts as an air cushion and takes up any minor variation in air pressure that may occur through minor changes in inside diameter or any other changes which give rise to fluctuations.

In the form of device illustrated in Figure 3, in lieu of utilizing a woolen strand tail or plug as illustrated in Figures 1 and 2, there is illustrated a device in which a solid plug of cross-section equal to that of the internal bore of the tubing being produced is utilized both for the purpose of maintaining the desired fluid pressure within the tubing during extrusion, and also to control the size of the tubing produced very closely. When the latter expedient is desired, the plug is placed close enough to the extrusion die so that the material is still in a semi-plastic condition. The plug in this case may be a cylindrical rod, ball, or any other shape desired, desirably of non-magnetic material attached as a tail to the laminated iron core. As shown in Figure 3, a ball 32 is employed, having a diameter exactly equal to that of the internal diameter of the tubing to be produced. By utilizing a sufficiently strong magnetic field, the extruded tubing is pulled over the ball 32 and expanded by a few thousandths of an inch to obtain the true internal bore desired.

In the modification shown in Figure 4, the plug is shown as of magnetizable material which is maintained in position by the solenoid, both for the purpose of retaining the necessary fluid pressure within the tubing 1 and also to shape the tubing to the desired internal bore. In this case the plug consists of magnetizable material, for example, in the shape of a cylinder 44 floating within the tubing 1 and maintained in position by the solenoid 5. Here again as in the device of Figure 3, the machine of Figure 4 is employed at a point where the tubing is still semi-plastic so that the plug serves not only to maintain the air pressure in the tubing 1, but also to shape the internal bore of the tubing to the true bore desired.

By the methods and means herein set forth, it is possible to extrude thermoplastic tubing particularly of synthetic resinous character, of true bore within a few thousandths of an inch tolerance by continuous extrusion methods avoiding any collapse of the tubing during such manufacture even when cut in any desired predetermined length, such as standard 12 foot length.

Any desired thermoplastic materials may be utilized in the production of such extruded tubing in accordance with the present invention, particularly synthetic resinous materials such as cellulose derivatives including the esters, particularly cellulose acetate and cellulose acetate butyrate, and the cellulose ethers such as ethyl cellulose; polymerized vinyl materials such as polymerized vinyl acetate, styrenes, and other thermoplastic and resinous compositions that may be extruded in continuous lengths, including the vinyl resins and nylon type resins.

While the core 4 has been set forth above to be produced of Swedish iron wire, it may be made of any desirable magnetizable material, as for example, alniko, etc. Whereas in the structure shown in Figure 4, the core 44 is itself utilized as the floating element, and that core is subjected to a solenoid or other magnetizing means to retain it in position, the material of which the floating element 44 is composed, should be of such nature, that it does not adhere so tenaciously to the extruded tubing being formed, as to be withdrawn from its position within the magnetic field created by the solenoid. Materials like brass or stainless steel may desirably be employed.

In connection with the type of material used for such elements it may also be pointed out that such choice of material may depend on the expedient employed for maintaining the floating plug in position. As illustrated herein, a solenoid has been employed to produce a magnetized field which acts on the mandrel or core to hold it in position. However, this is illustrated only for purposes of explanation and exemplification and any other means may be employed in this connection to hold the plug in position within the extruded tube. Thus it is possible to utilize eddy currents or to use induced currents to float a desired plug or device within the extruded tube for these purposes and the choice of material from which the floating element is produced will depend on the exact conditions under which such element is employed.

In connection with the core described herein, it may be pointed out that the eddy currents from the solenoid described herein create a substantial amount of heat if the core is not laminated. Where, however, the plug is used as shown in Figures 3 or 4, where we actually "draw" the inside bore of the tube, the heat generated by eddy currents may be advantageously utilized.

There is an outstanding advantage in the use of the invention in making long coils of tubing of, for example, relatively small diameter such as ⅜" O. D. × ¼" I. D. in coils of about 1000 feet length. It was found that even under such conditions, the volume of air that leaked past the device was so insignificant that there was no worthwhile friction built up and the necessary tolerances were readily maintained in holding the tubing throughout its length to the shape desired with accuracy of dimension as herein set forth.

While the invention has been particularly illustrated in connection with the production of synthetic resinous tubing by extrusion methods, it may be utilized in connection with other materials and may be employed in the extrusion of metal as well as synthetic resinous tubing, as for example, in the production of thin aluminum or other metallic tubing, lead piping, etc., particularly where continuous lengths of such products are to be obtained.

Having thus set forth my invention, I claim:

1. The method of manufacturing thermoplastic tubing by extrusion which comprises extruding thermoplastic tubing, introducing a fluid within the tubing during extrusion to prevent collapse of the tubing, floating a plug within the tubing to maintain the fluid pressure therein, and cooling the tubing to at least a partially set condition.

2. The method of manufacturing thermoplastic tubing by extrusion which comprises extruding thermoplastic tubing, cooling the tubing to a partially set condition, cutting the extruded tubing at a point where it is substantially rigid to a predetermined length, introducing a fluid within the extruded tubing to prevent collapse thereof, and floating a plug within the tubing between the points of extrusion and cutting to maintain fluid pressure therein up to the point where the plug is positioned.

3. In the method of manufacturing thermoplastic tubing by extruding thermoplastic tubing, cooling the tubing to partially set condition, and cutting the extruded tubing at a point where it is substantially rigid to a predetermined length, the steps of introducing a fluid within the extruded tubing to prevent collapse thereof, and floating a plug within the tubing between the points of extrusion and cutting to maintain fluid pressure therein up to the point where the plug is positioned.

4. The method of manufacturing thermoplastic tubing by extrusion which comprises extruding thermoplastic tubing, cooling the tubing to a partially set condition, cutting the extruded tubing at a point where it is substantially rigid to a predetermined length, introducing a fluid within the extruded tubing to prevent collapse thereof, and floating a plug within the tubing between the points of extrusion and cutting at a substantial distance from the point of extrusion, to maintain fluid pressure within the tubing up to the point where the plug is positioned.

5. The method of manufacturing thermoplastic tubing by extrusion which comprises extruding thermoplastic tubing, cooling the tubing to a partially set condition, cutting the extruded tubing at a point where it is substantially rigid to a predetermined length, introducing a fluid within the extruded tubing to prevent collapse thereof, and floating a plug of woolen strands within the tubing between the points of extrusion and cutting to maintain fluid pressure therein up to the point where the plug is positioned.

6. The method of manufacturing thermoplastic tubing by extrusion which comprises extruding thermoplastic tubing, cooling the tubing to a partially set condition, cutting the extruded tubing at a point where it is substantially rigid to a predetermined length, introducing a fluid within the extruded tubing to prevent collapse thereof, and floating a rigid plug of cross-section equal to that of the internal bore of the tubing, within the tubing at a point where the tubing is semi-plastic to control the size of the tubing and to maintain fluid pressure therein up to the point where the plug is positioned.

7. The method of manufacturing thermoplastic tubing by extrusion which comprises extruding thermoplastic tubing, cooling the tubing to a partially set condition, cutting the extruded tubing at a point where it is substantially rigid to a predetermined length, introducing a fluid within the extruded tubing to prevent collapse thereof, and floating a non-metallic rigid plug of circular cross-section equal to that of the internal bore of the tubing, within the tubing at a point where the tubing is semi-plastic to control the size of the tubing and to maintain fluid pressure therein up to the point where the plug is positioned.

8. Apparatus for manufacturing thermoplastic tubing by extrusion comprising means for extruding thermoplastic tubing, means for introducing fluid pressure within the tubing during extrusion to prevent collapse of the tubing, and means within the tubing to maintain the fluid pressure therein, and means for cooling the tubing.

9. Apparatus for manufacturing thermoplastic tubing by extrusion comprising means for extruding thermoplastic tubing, means for cooling the tubing, means for introducing fluid pressure within the tubing during extrusion and cooling to prevent collapse of the tubing, and means floating within the tubing to maintain the fluid pressure therein.

10. Apparatus for manufacturing thermoplastic tubing by extrusion comprising means for extruding thermoplastic tubing, means for cooling the tubing to a partially set condition, means for cutting the extruded tubing at a point where it is substantially rigid to a predetermined length, means for introducing a fluid within the extruded tubing to prevent collapse thereof, and means for floating a plug within the tubing between the points of extrusion and cutting to maintain fluid pressure therein up to the point where the plug is positioned.

11. Apparatus for manufacturing thermoplastic tubing by extrusion which apparatus includes means for extruding thermoplastic tubing, means for cooling the tubing, and means for cutting the tubing at a point where it is substantially rigid to a predetermined length, comprising means for introducing a fluid within the extruded tubing to prevent collapse thereof, and means for floating a plug within the tubing between the points of extrusion and cutting to maintain fluid pressure therein up to the point where the plug is positioned.

12. In apparatus for manufacturing thermoplastic tubing which includes means for extruding thermoplastic tubing, means for cooling the tubing to a partially set condition, means for cutting the extruded tubing at a point where it is substantially rigid to a predetermined length, and means for introducing a fluid within the extruded tubing to prevent collapse thereof, means for floating a plug within the tubing between the points of extrusion and cutting to maintain fluid pressure therein up to the point where the plug is positioned.

13. Apparatus for manufacturing thermoplastic tubing by extrusion comprising means for extruding thermoplastic tubing, means for cooling the tubing, means for cutting the extruded tubing at a point where it is substantially rigid, to a predetermined length, means for introducing a fluid within the extruded tubing to prevent collapse thereof, and means including a floating plug of woolen strands within the tubing between the points of extrusion and cutting to maintain fluid pressure therein up to the point where the plug is positioned.

14. Apparatus for manufacturing thermoplastic tubing by extrusion comprising means for extruding thermoplastic tubing, means for cooling the tubing, means for cutting the tubing at a point where it is substantially rigid to a predetermined length, means for introducing a fluid within the extruded tubing to prevent collapse thereof, and means for floating a rigid plug of cross-section equal to that of the internal bore of the tubing, within the tubing at a point where the tubing is semi-plastic to control the size of the tubing and to maintain fluid pressure therein up to the point where the plug is positioned.

15. Apparatus for manufacturing thermoplastic tubing by extrusion comprising means for extruding thermoplastic tubing, means for cooling the tubing to a partially set condition, means for cutting the extruded tubing at a point where it is substantially rigid to a predetermined length, means for introducing a fluid within the extruded tubing to prevent collapse thereof, and means for floating a plug within the tubing between the points of extrusion and cutting to maintain fluid pressure therein up to the point where the plug is positioned, said means for floating the plug including a magnetizable core, a plug attached thereto, and means adjacent the point where the plug is to be maintained for generating a magnetic field.

16. Apparatus for manufacturing thermoplastic tubing by extrusion comprising means for extruding thermoplastic tubing, means for cooling the tubing to a partially set condition, means for cutting the extruded tubing at a point where it is substantially rigid to a predetermined length, means for introducing a fluid within the extruded tubing to prevent collapse thereof, and means for floating a plug within the tubing between the points of extrusion and cutting to maintain fluid pressure therein up to the point where the plug is positioned, said means for floating the plug including a magnetizable core, a plug attached thereto, and means including a hollow solenoid surrounding the extruded tube adjacent the point where the plug is to be maintained for generating a magnetic field.

CHARLES E. SLAUGHTER.